United States Patent
Wei et al.

(10) Patent No.: US 10,397,969 B2
(45) Date of Patent: Aug. 27, 2019

(54) METHOD AND DEVICE FOR ESTABLISHING BACKHAUL LINK

(71) Applicant: Beijing Xiaomi Mobile Software Co., Ltd., Beijing (CN)

(72) Inventors: Na Wei, Beijing (CN); Ran Xu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/712,176

(22) Filed: Sep. 22, 2017

(65) Prior Publication Data

US 2018/0092141 A1    Mar. 29, 2018

(30) Foreign Application Priority Data

Sep. 29, 2016  (WO) ................ PCT/CN2016/100789

(51) Int. Cl.
*H04W 76/02* (2009.01)
*H04W 72/10* (2009.01)
(Continued)

(52) U.S. Cl.
CPC ........... *H04W 76/12* (2018.02); *H04W 24/02* (2013.01); *H04W 72/046* (2013.01);
(Continued)

(58) Field of Classification Search
CPC ... H04W 76/12; H04W 72/10; H04W 72/046; H04W 40/246; H04W 16/10;
(Continued)

(56) References Cited

U.S. PATENT DOCUMENTS 8,254,943 B1 * 8/2012 Dinan et al. .......... 455/450
8,913,494 B1 12/2014 Marupaduga et al.
(Continued)

FOREIGN PATENT DOCUMENTS

CN    103501499 A    1/2014
CN    104969653 A    10/2015
(Continued)

OTHER PUBLICATIONS

Extended European Search Report issued in European Application No. 17168155.4, from the European Patent Office, dated Aug. 22, 2017.
(Continued)

*Primary Examiner* — Meless N Zewdu
(74) *Attorney, Agent, or Firm* — Finnegan, Henderson, Farabow, Garrett & Dunner LLP

(57) ABSTRACT

A method for establishing a backhaul link, applied to a base station, includes: broadcasting system information to cause a terminal receiving the system information to return backhaul link establishment signaling, wherein the terminal has established a first communication link with a core network; receiving the backhaul link establishment signaling returned by the terminal, the backhaul link establishment signaling being configured to indicate the terminal to establish a backhaul link for the base station; and sending a confirmation message to the terminal to cause the terminal to establish a second communication link with the base station after receiving the confirmation message, the second communication link and the first communication link forming the backhaul link.

11 Claims, 11 Drawing Sheets

(51) Int. Cl.
*H04W 92/20* (2009.01)
*H04W 72/04* (2009.01)
*H04W 76/12* (2018.01)
*H04W 24/02* (2009.01)
*H04L 12/717* (2013.01)
*H04W 16/10* (2009.01)
*H04W 40/24* (2009.01)
*H04W 88/04* (2009.01)
*H04W 88/08* (2009.01)
*H04W 92/04* (2009.01)

(52) U.S. Cl.
CPC .......... *H04W 72/10* (2013.01); *H04W 92/20* (2013.01); *H04L 45/42* (2013.01); *H04W 16/10* (2013.01); *H04W 40/246* (2013.01); *H04W 88/04* (2013.01); *H04W 88/08* (2013.01); *H04W 92/045* (2013.01)

(58) Field of Classification Search
CPC ... H04W 92/045; H04W 92/20; H04W 24/02; H04W 88/04; H04W 88/08; H04W 76/02; H04W 72/04; H04W 88/14; H04W 28/06; H04W 76/00; H04W 76/10; H04W 76/11; H04W 76/15; H04W 76/19; H04W 76/20; H04W 76/25; H04W 36/0027; H04W 88/02; H04W 88/023; H04W 36/0033; H04W 36/0038; H04W 36/0044; H04W 36/0072; H04W 72/0406; H04W 36/26; H04W 36/28; H04W 36/30; H04W 72/044; H04W 72/08; H04W 72/048; H04W 76/16; H04W 76/18; H04W 88/00; H04W 92/00; H04W 92/10; H04W 92/04; H04W 92/16; H04L 45/42
See application file for complete search history.

(56) References Cited

U.S. PATENT DOCUMENTS

| 9,894,164 | B2* | 2/2018 | Petersen et al. ........ H04L 67/16 |
| 2010/0265818 | A1* | 10/2010 | Chen et al. .................. 370/217 |
| 2011/0080864 | A1* | 4/2011 | Cai et al. ..................... 370/315 |
| 2012/0026865 | A1 | 2/2012 | Fan et al. |
| 2012/0120887 | A1* | 5/2012 | Deaton et al. ............... 370/329 |
| 2013/0051308 | A1 | 2/2013 | Picker |
| 2013/0310052 | A1* | 11/2013 | Imus et al. ............ H04W 28/10 |
| 2014/0092803 | A1 | 4/2014 | Picker |
| 2014/0105136 | A1 | 4/2014 | Tellado et al. |
| 2014/0235261 | A1 | 8/2014 | Fan et al. |
| 2014/0365671 | A1* | 12/2014 | Petersen et al. ...... H04L 67/141 |
| 2015/0078167 | A1 | 3/2015 | Papa et al. |
| 2015/0109943 | A1* | 4/2015 | Sahin et al. .......... H04W 24/02 |
| 2016/0066209 | A1* | 3/2016 | Lin .................. H04W 28/0289 |
| 2016/0142944 | A1* | 5/2016 | Cao .................. H04W 36/0023 |
| 2016/0198475 | A1* | 7/2016 | Uchiyama et al. ......................... H04W 72/0473 |
| 2017/0034718 | A1 | 2/2017 | Fan et al. |
| 2017/0099685 | A1 | 4/2017 | Wallentin et al. |
| 2017/0223542 | A1* | 8/2017 | Zhang et al. |
| 2017/0347302 | A1* | 11/2017 | Li et al. ................ H04W 36/22 |

FOREIGN PATENT DOCUMENTS

| JP | 2009534924 A | 9/2009 | |
| JP | 2014522601 A | 9/2014 | |
| RU | 2490828 C2 | 8/2013 | |
| WO | WO 2011/120559 A1 | 10/2011 | |
| WO | WO 2015015242 A1 | 2/2015 | |
| WO | WO 2015/042966 A1 * | 4/2015 | ............ H04W 40/22 |
| WO | WO 2015/144218 A1 | 10/2015 | |
| WO | WO 2016036182 A1 | 3/2016 | |

OTHER PUBLICATIONS

International Search Report for International Application No. PCT/CN2016/100789, mailed form the State Intellectual Property Office of China dated Jun. 7, 2017.
Office Action in counterpart Russian Application No. 2017142139/07(072875), dated Jul. 24, 2018.
English version of International Search Report of PCT Application No. PCT/CN2016/100789, dated Jun. 7, 2017, issued by the ISA/CN—State Intellectual Property Office of the P.R. China.
Notice of Allowance issued in counterpart Japanese Application No. 2018-519928, dated Jun. 4, 2019.

* cited by examiner

US 10,397,969 B2

METHOD AND DEVICE FOR ESTABLISHING BACKHAUL LINK

CROSS-REFERENCE TO RELATED APPLICATIONS

This application is based upon and claims priority to International Application No. PCT/CN2016/100789, filed on Sep. 29, 2016, which is incorporated herein by reference in its entirety.

TECHNICAL FIELD

The present disclosure generally relates to the field of wireless communications, and more particularly, to a method and device for establishing a backhaul link.

BACKGROUND

A backhaul link refers to a communication link between a base station and a core network, and the base station may provide communication service for a terminal within coverage of the base station after accessing the core network through the backhaul link.

With the development of wireless communication technologies, in order to expand communication coverage, deploying base stations on a large scale has become a trend. For each base station, a service provider may usually deploy a fixed backhaul link to the base station, such that the base station may access a core network through the fixed backhaul link, thereby providing communication service for a terminal within the coverage, for example, by transmitting data of the core network to the terminal or transmitting data of the terminal to the core network.

SUMMARY

According to a first aspect of the present disclosure, there is provided a method for establishing a backhaul link, applied to a base station, the method comprising: broadcasting system information to cause a terminal receiving the system information to return backhaul link establishment signaling, wherein the terminal has established a first communication link with a core network; receiving the backhaul link establishment signaling returned by the terminal, the backhaul link establishment signaling being configured to indicate the terminal to establish a backhaul link for the base station; and sending a confirmation message to the terminal to cause the terminal to establish a second communication link with the base station after receiving the confirmation message, the second communication link and the first communication link forming the backhaul link.

According to a second aspect of the present disclosure, there is provided a base station, comprising: a processor; and a memory for storing instructions executed by the processor; wherein the processor is configured to: broadcast system information to cause a terminal receiving the system information to return backhaul link establishment signaling, wherein the terminal has established a first communication link with a core network; receive the backhaul link establishment signaling returned by the terminal, the backhaul link establishment signaling being configured to indicate the terminal to establish a backhaul link for the base station; and send a confirmation message to the terminal to cause the terminal to establish a second communication link with the base station after receiving the confirmation message, the second communication link and the first communication link forming the backhaul link.

According to a third aspect of the present disclosure, there is provided a non-transitory computer-readable storage medium having stored therein instructions that, when executed by a processor of a base station, cause the base station to perform a method for establishing a backhaul link, the method comprising: broadcasting system information to cause a terminal receiving the system information to return backhaul link establishment signaling, wherein the terminal has established a first communication link with a core network; receiving the backhaul link establishment signaling returned by the terminal, the backhaul link establishment signaling being configured to indicate the terminal to establish a backhaul link for the base station; and sending a confirmation message to the terminal to cause the terminal to establish a second communication link with the base station after receiving the confirmation message, the second communication link and the first communication link forming the backhaul link.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Figure 1:
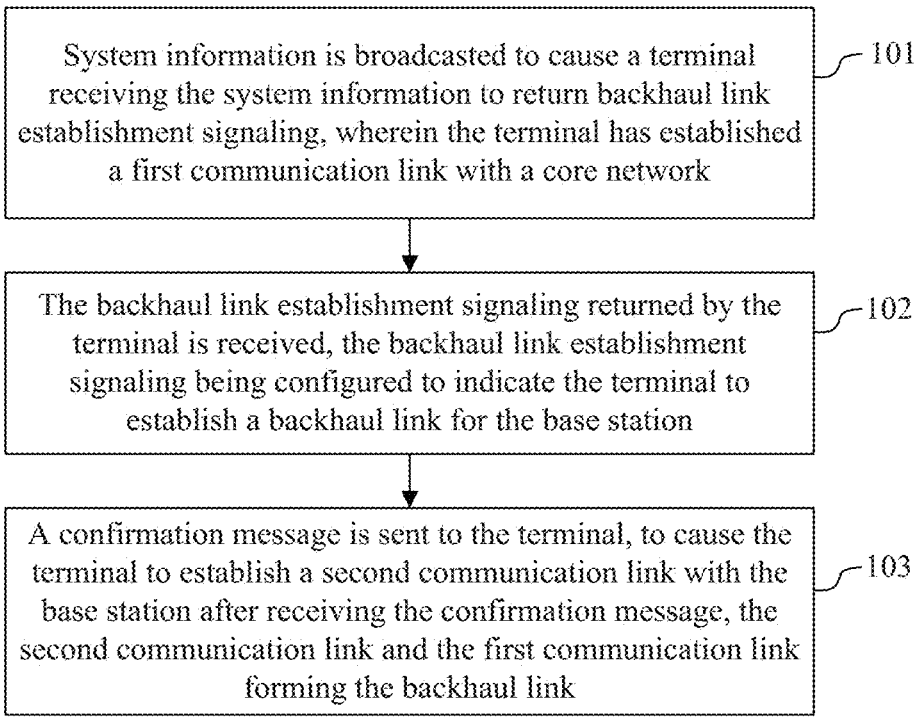
FIG. 1 is a flow chart of a method for establishing a backhaul link according to an exemplary embodiment.

FIG. 1 is a flow chart of a method 100 for establishing a backhaul link according to an exemplary embodiment. For example, the method 100 may be applied to a base station. Referring to FIG. 1, the method 100 includes the following steps.

In step 101, system information is broadcasted by the base station to cause a terminal receiving the system information to return backhaul link establishment signaling, wherein the terminal has established a first communication link with a core network.

In step 102, the backhaul link establishment signaling returned by the terminal is received by the base station, the backhaul link establishment signaling being configured to indicate the terminal to establish a backhaul link for the base station.

In step 103, a confirmation message is sent to the terminal, to cause the terminal to establish a second communication link with the base station after receiving the confirmation message, the second communication link and the first communication link forming the backhaul link.

In related technologies, a backhaul link of a mini base station is required to be pre-deployed by a service provider, and the deployed backhaul link is fixed and has poor extensibility. In embodiments of the present disclosure, the base station may establish a backhaul link through the terminal which has established the first communication link with the core network, and the restriction of a fixed backhaul link in the related technologies is removed.

According to the method 100, the second communication link is established between the terminal which has established the first communication link with the core network and the base station, and the first communication link and the second communication link form the backhaul link. Then the base station may access the core network through the backhaul link. The method 100 provides a flexible and convenient manner for establishing a backhaul link. A base station may establish multiple backhaul links by using the method 100, achieving strong extensibility.

In one embodiment, different time resources are configured for a communication link between the base station and any terminal in a coverage of the base station and the backhaul link.

In one embodiment, different frequency resources are configured for the communication link between the base station and any terminal in the coverage of the base station and the backhaul link.

In one embodiment, spaces occupied by beams corresponding to the communication link between the base station and any terminal in the coverage of the base station and the backhaul link do not overlap.

In one embodiment, the method 100 further includes: under a condition that the base station has established multiple backhaul links, at least one data packet sent by a terminal located in the coverage of the base station is received by the base station; a quality of service class identifier (QCI) of the at least one data packet is acquired, the QCI being configured to indicate a communication priority of the at least one data packet; and the at least one data packet is allocated to the multiple backhaul links on the basis of current remaining bandwidths of the multiple backhaul links and the QCI of the at least one data packet.

In one embodiment, the method 100 further includes: under a condition that the base station has not established any backhaul link yet, if an access request of a terminal is received, the access request is denied.

All of the above-described embodiments may be freely combined into new embodiments, which will not be limited in the present disclosure.

Figure 2:
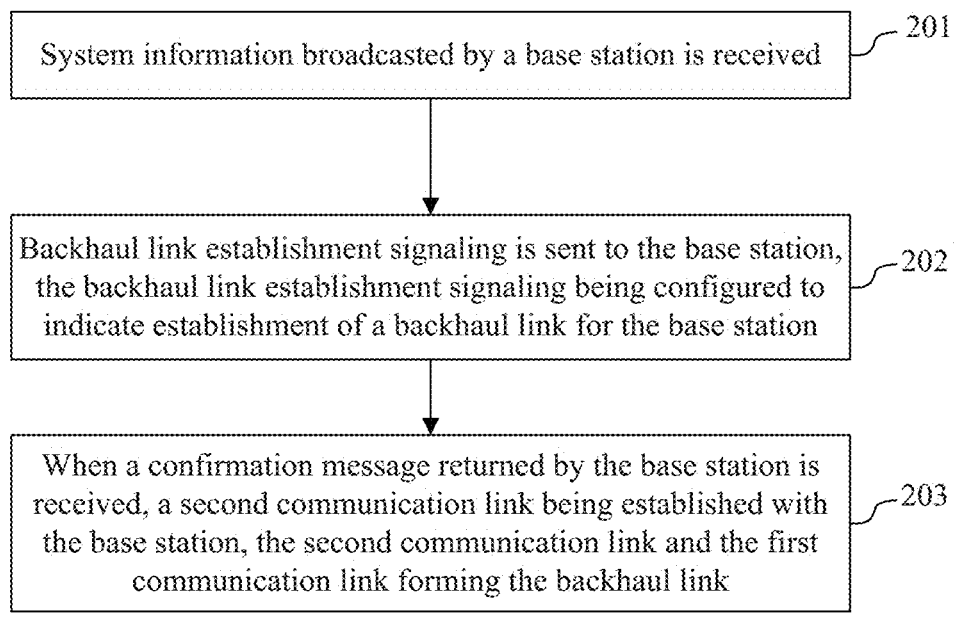
FIG. 2 is a flow chart of a method for establishing a backhaul link, according to an exemplary embodiment.

FIG. 2 is a flow chart of a method 200 for establishing a backhaul link according to an exemplary embodiment. For example, the method 200 may be applied to a terminal which has established a first communication link with a core network. Referring to FIG. 2, the method 200 includes the following steps.

In step 201, system information broadcasted by a base station is received by the terminal.

In step 202, backhaul link establishment signaling is sent to the base station, the backhaul link establishment signaling being configured to indicate establishment of a backhaul link for the base station.

In step 203, when a confirmation message returned by the base station is received, a second communication link is established with the base station, the second communication link and the first communication link forming a backhaul link.

According to the method 200, the second communication link is established between the terminal which has established the first communication link with the core network and the base station, and the first communication link and the second communication link form the backhaul link. Then the base station may access the core network through the backhaul link. The method 200 provides a flexible and convenient manner for establishing a backhaul link. A base station may establish multiple backhaul links by using the method 200, achieving strong extensibility.

Figure 3:
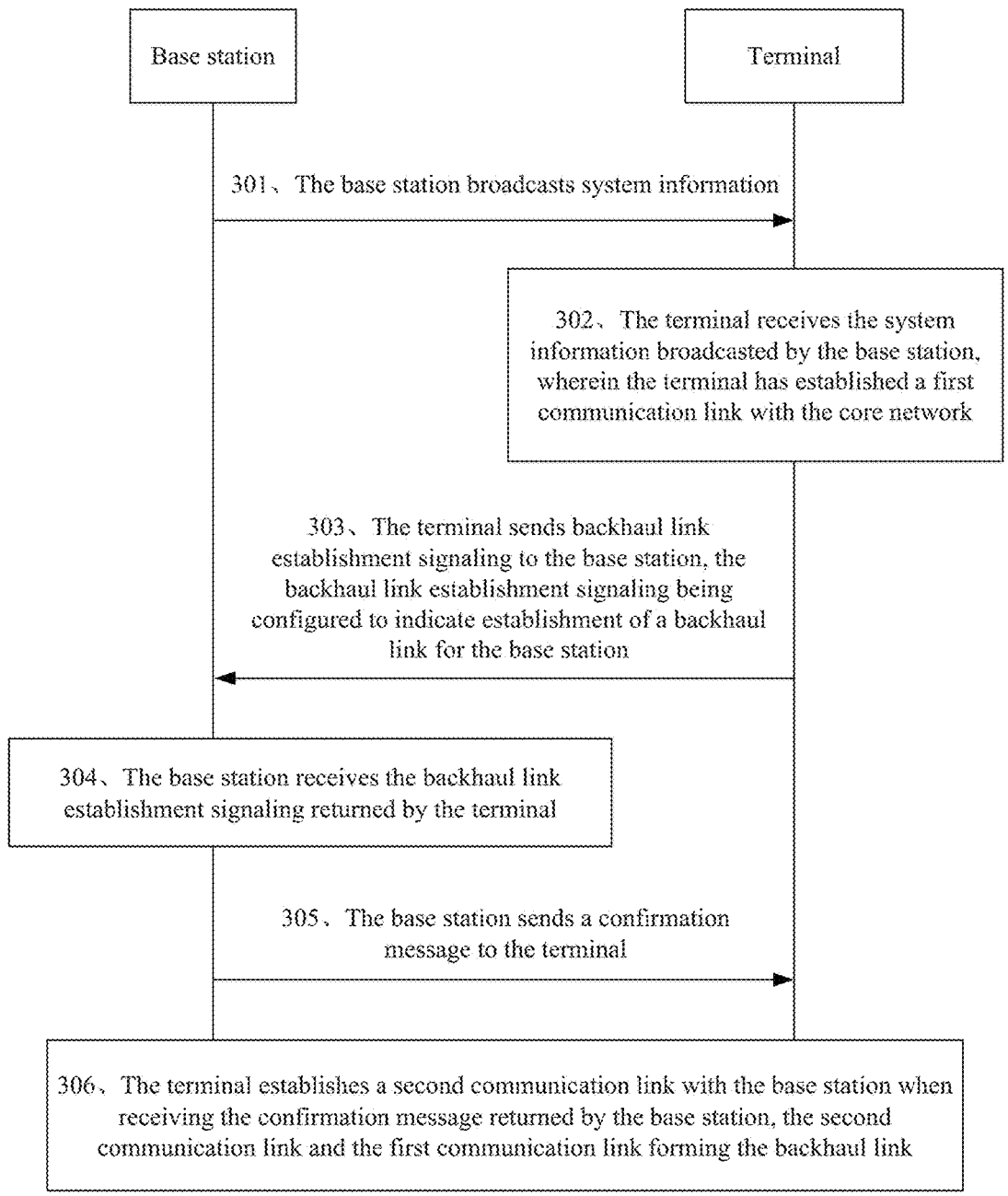
FIG. 3 is a flow chart of a method for establishing a backhaul link, according to an exemplary embodiment.

FIG. 3 is a flow diagram of a method 300 for establishing a backhaul link according to an exemplary embodiment. For example, the method 300 may be applied to a communication system including a base station and a terminal which has established a first communication link with a core network. Referring to FIG. 3, the method 300 includes the following steps.

In step 301, the base station broadcasts system information.

In exemplary embodiments, a backhaul link refers to a communication link between a base station and a core network, the core network may serve as an interface between the base station and an external network, and the base station may normally provide communication service for a terminal in its coverage after accessing the core network. For example, the base station transmits data of the core network to the terminal in the coverage, or transmits data of the terminal in the coverage to the core network for transmission to an external network through the core network.

In exemplary embodiments, the base station may be a mini base station, a base station of another type or the like. If an existing backhaul link bandwidth of a mini base station cannot meet a bandwidth requirement, or if no backhaul link has been deployed for the mini base station, the method 300 may be adopted to establish the backhaul link. In addition, multiple backhaul links may also be established for the base station by adopting the method 300, thereby forming an aggregated backhaul link and enabling the base station to communicate more efficiently.

After being initially started, the base station may broadcast system information for a terminal to search and access. The system information is pre-configured information of the base station, which may include basic configuration information of the base station, such as a Master Information Block (MIB) and a System Information Block (SIB). There is no limit to the system information in the present disclosure.

Different from broadcasting system information after accessing the core network in the related technology, broadcasting the system information is started after initial starting in the embodiment of the present disclosure, so as to establish the backhaul link through the system information.

In step 302, the terminal receives the system information broadcasted by the base station, wherein the terminal has established a first communication link with the core network.

In step 303, the terminal sends backhaul link establishment signaling to the base station, the backhaul link establishment signaling being configured to indicate establishment of a backhaul link for the base station.

There is no limit to the terminal in the present disclosure. For example, the terminal may be a mobile phone, a tablet computer or the like, which has accessed the core network. There is also no limit to a position of the terminal in the present disclosure, as long as the terminal may receive the system information broadcasted by the base station.

The backhaul link establishment signaling may be radio resource control (RRC) signaling, and an information element of the signaling carries a backhaul link establishment identifier. When receiving the signaling sent by the terminal, the base station may determine that the signaling is backhaul link establishment signaling on the basis of the backhaul link establishment identifier carried in the signaling. There is no limit to the information element in the present disclosure. For example, the following information element of the signaling may include the backhaul link establishment identifier "provideBackhaul".

EstablishmentCause::=ENUMERATED{
emergency, highPriorityAccess, mt-Access, mo-Signalling, mo-Data,
delayTolerantAccess-v1020, provideBackhaul, spare1}.

In a process of broadcasting system information by the base station, when receiving the system information broadcasted by the base station, the terminal may generate backhaul link establishment signaling and send the backhaul link establishment signaling to the base station to indicate that the terminal has accessed the core network and may establish a backhaul link for the base station.

Since the terminal has established the first communication link with the core network and may communicate with the core network through the first communication link, the base station may be connected to the core network through the terminal as long as a communication link is established between the base station and the terminal. In order to establish a communication link between the base station and the terminal, the terminal sends backhaul link establishment signaling to the base station when receiving the system information broadcasted by the base station.

There is no limit to the manner of establishing the first communication link in the present disclosure. For example, the terminal accesses the core network through a wireless local area network (WLAN), thereby establishing the first communication link.

There may be multiple terminals to receive the system information when the base station broadcasts the system information, so as to send backhaul link establishment signaling to the base station. Accordingly, the base station may receive multiple backhaul link establishment signalings, and establish backhaul links according to the received multiple backhaul link establishment signalings. For different terminals that have established communication links with the core network, the process of establishing a backhaul link is similar.

In step 304, the base station receives backhaul link establishment signaling returned by the terminal.

In step 305, the base station sends a confirmation message to the terminal.

In the exemplary embodiment, when the base station receives the backhaul link establishment signaling, the base station may determine that the terminal may establish a backhaul link for the base station according to the backhaul link establishment signaling, and the base station may send a confirmation message to the terminal to indicate that the base station agrees to establish the backhaul link.

In one embodiment, the base station may judge whether the base station needs establishment of a backhaul link or not when receiving the backhaul link establishment signaling. If the base station needs establishment of a backhaul link, the base station sends a confirmation message to the terminal; and if the base station does not need establishment of a backhaul link, the base station may send a denial message to the terminal.

For example, conditions under which the base station needs establishment of a backhaul link include at least: currently there is no available backhaul link, or a current bandwidth requirement is relatively high and an existing backhaul link bandwidth may not meet a current bandwidth requirement. Also for example, conditions under which the base station does not need establishment of a backhaul link include at least: currently there is an available backhaul link, or the existing backhaul link bandwidth may meet the current bandwidth requirement.

In exemplary embodiments, if the base station receives backhaul link establishment signaling from multiple terminals, the base station may establish backhaul links through some of the multiple terminals, while not establishing backhaul links through the other terminals.

In one embodiment, the base station may select one or more terminals to establish backhaul links from multiple terminals according to the current bandwidth requirement and bandwidth provided by each terminal in the multiple terminals, to enable a sum of bandwidths provided by the selected terminals to meet the current bandwidth requirement of the base station, and the base station may subsequently send confirmation messages to the selected terminals and send denial messages to the remaining terminals.

For example, the base station receives backhaul link establishment signaling sent by five terminals within a current communication period, and then may send confirmation messages to three terminals of the five terminals, to establish backhaul links through the three terminals while sending denial messages to the other two terminals in the next communication period, so that sufficient backhaul links may be established to meet the current bandwidth requirement, and a waste of backhaul link resources may be avoided.

In step 306, the terminal establishes a second communication link with the base station when receiving the confirmation message returned by the base station, the second communication link and the first communication link forming the backhaul link.

If the terminal receives the confirmation message of the base station, the base station and the terminal have confirmed identities of each other, and both agree to establish the backhaul link for the base station through the terminal. Therefore, in step 306, the terminal establishes the second communication link with the base station, and the base station may be connected to the core network through the first communication link and the second communication link, that is, the backhaul link is established for the base station.

In the method 300, the base station may establish a backhaul link through any terminal that has established a communication link with the core work, without limit of a type and a position of the terminal, so that flexibility is improved. Moreover, the base station may establish one or more backhaul links, so that a current communication requirement is met, and strong extensibility is achieved.

When the establishment of the backhaul link is completed, the base station may communicate with the core network through the backhaul link, thereby providing communication service for the terminal in its coverage.

Figure 4A:
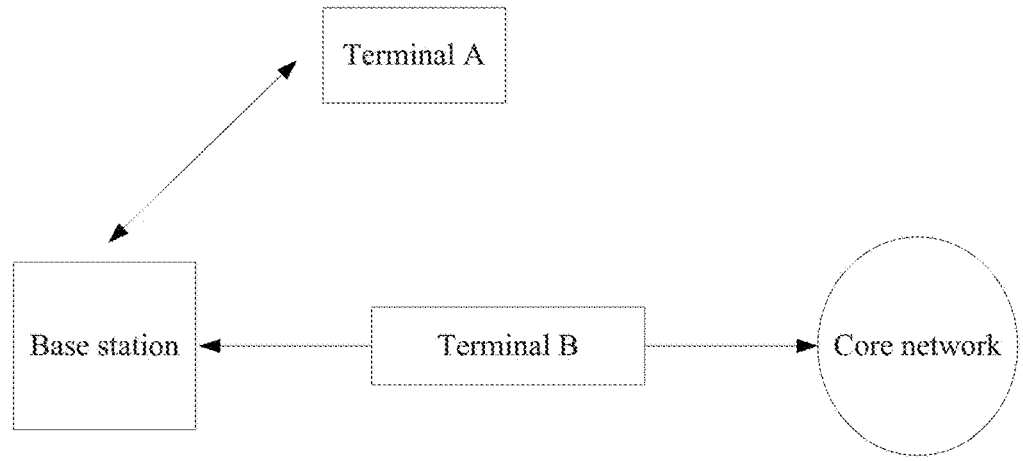
FIG. 4A is a schematic diagram of a communication system, according to an exemplary embodiment.

FIG. 4A is a schematic diagram of a communication system 400 according to an exemplary embodiment. As shown in FIG. 4A, in the communication system 400, a terminal A may be any terminal in a coverage of a base station. Uplink communication of the communication system includes, e.g., the terminal A sends data to the base station, the base station sends the data to a terminal B that has established a communication link with a core network, and the terminal B uploads the data to the core network. Downlink communication of the communication system includes, e.g., the terminal B acquires data from the core network, and sends the data to the base station, and the base station sends the data to the terminal A.

In exemplary embodiments, the base station may establish one or more backhaul links.

When the base station has established only one backhaul link, during uplink communication, a terminal in the coverage sends a data packet to the base station, and the base station uploads the data packet to the core network through the backhaul link. Specifically, the data packet is received from the terminal through a second communication link, and another terminal that has established a first communication link with the core network uploads the data packet to the core network. During downlink communication, the base station acquires a data packet from the core network through the backhaul link, and then sends the data packet to the terminal in the coverage.

When the base station has established multiple backhaul links, during downlink communication, the base station receives data packets on the multiple backhaul links, and sends the received data packets to a terminal in the coverage.

During uplink communication, the base station receives at least one data packet sent by at least one terminal located in the coverage of the base station, acquires a QCI of the at least one data packet, and allocates the at least one data packet to the multiple backhauls on the basis of current remaining bandwidths of the multiple backhaul links and the QCI of the at least one data packet.

The QCI is configured to indicate a communication priority of the at least one data packet, and may be obtained according to a service type, a packet loss rate and a predicted delay of the at least one data packet. QCIs may be divided into 9 classes, and if a QCI of one data packet of two received data packet is class 1 while a QCI of the other data packet is class 7, it is indicated that a communication priority of the former is higher and the former is preferably transmitted first.

In exemplary embodiments, the base station may allocate a data packet to a backhaul link with a relatively large current remaining bandwidth when receiving the data packet.

For example, the base station has two backhaul links L1 and L2, a current remaining bandwidth of L1 is 5M, a current remaining bandwidth of L2 is 10M, and then the data packet may be sent through L2.

In such an allocation manner, not only the data packet may be preferably sent, but also the remaining bandwidth of the backhaul link is decreased after a bandwidth of the backhaul link is occupied by the data packet, such that the remaining bandwidths of different backhaul links may not have a great difference, so as to ensure load balance of the backhaul links, and alleviate bandwidth stress of the backhaul links.

In exemplary embodiments, when the base station receives multiple data packets, the data packets with relatively high communication priorities are allocated to the backhaul links with the relatively large current remaining bandwidths, and the data packets with relatively low communication priorities are allocated to the backhaul links with the relatively smaller current remaining bandwidths, so as to ensure that the data packets with the relatively high communication priorities may be preferably transmitted.

For example, the base station has two backhaul links L1 and L2 and receives two data packets p and y, a QCI of p is class 2, and a QCI of y is class 5. It indicates that a communication priority of p is higher than a communication priority of y, a current remaining bandwidth of L1 is 5M, a current remaining bandwidth of L2 is 1M, then p is preferably allocated to L1 and y is allocated to L2.

In exemplary embodiments, when receiving data packets of multiple terminals in the coverage of the base station, the base station may recombine the multiple received data packets into one data packet on the basis of the current remaining bandwidth of at least one backhaul link, and allocate it to any backhaul link.

For example, the base station has two backhaul links L1 and L2, and when the base station receives two data packets, a current remaining bandwidth of L1 is 1M, a current remaining bandwidth of L2 is 10M, and then the base station may recombine the two data packets into one data packet and allocate it to L2, so that a utilization rate of an idle backhaul link is increased.

Figure 4B:
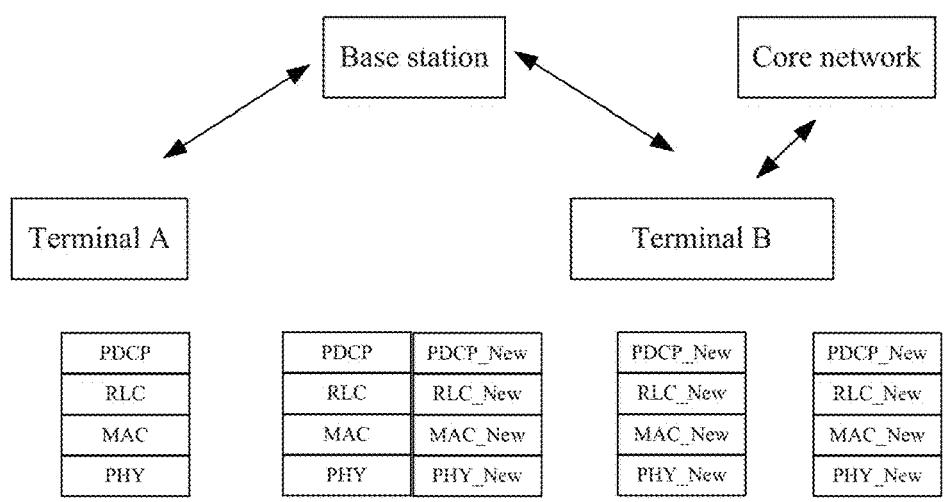
FIG. 4B is a schematic diagram of a packet recombination process, according to an exemplary embodiment.

There is no limit to the above packet recombination manner in the present disclosure. For example, FIG. 4B is a schematic diagram illustrating a packet recombination process 410 according to an exemplary embodiment. Referring to FIG. 4B, the terminal A sends two data packets to the base station, and a packet combination is performed on the two data packets sequentially according to an order of a Physical Layer (PHY) protocol, a Medium/Media Access Control (MAC) protocol, a Radio Link Control (RLC) protocol and a Packet Data Convergence Protocol (PDCP). Then the base station depacketizes the two received data packets layer by layer in the sequence of the PDCP, the RLC protocol, the MAC protocol and the PHY protocol to acquire data corresponding to each layer of the two data packets, and combines the data corresponding to the same layer of the two data packets to further obtain a new data packet according to the sequence of the PHY protocol, the MAC protocol, the RCL protocol and the PDDP, and the data of each layer in the new data packet may be represented as PDCP_New, RLC_New, MAC_New and PHY_New.

In exemplary embodiments, during downlink communication, if the base station receives multiple data packets from different backhaul links and the multiple data packets correspond to the same terminal, these data packets may also be recombined into a data packet for sending to the terminal corresponding to the multiple data packets. Such a packet combination manner is similar to the above described packet combination manner, and will not be repeated herein.

In exemplary embodiments, in order to avoid invalid communication, under the condition that the base station has not established any backhaul link yet, if an access request of any terminal is received, the access request is denied. This is because the system information broadcasted by the base station may be received by any terminals in its coverage and these terminals may send access requests to the base station after receiving the system information. At this moment, if the base station has not established any available backhaul link yet, these terminals may also not transmit data to the core network through the base station or acquire data from the core network through the base station after accessing the base station. Therefore, in order to avoid resource waste, the base station may deny the access request to prevent these terminals from accessing the base station.

In exemplary embodiments, when communicating with any terminal in the coverage of the base station, the base station may also communicate with the core network through the backhaul link. In order to avoid mutual interference of a communication link between the base station and any terminal in the coverage of the base station and the established backhaul link, different transmission resources may be allocated to them, which is not limited in the present disclosure. For example, the transmission resources may be time resources, frequency resources, beams or the like.

In one embodiment, different time resources are configured for a communication link between the base station and any terminal in the coverage of the base station and a backhaul link.

For example, different sub-frames on the base station are allocated to two links respectively. For sub-frame 1 to sub-frame 10, the sub-frames with odd labels are allocated to the communication link between the base station and any terminal in the coverage of the base station, and the sub-frames with even labels are allocated to the backhaul link, so that the above two links perform data transmission in different sub-frames. In this example, the same frequency resource may be adopted for communication on the two links, so that frequency resources are saved. Moreover, since the sub-frames of the two communication links are isolated from each other, mutual interference during communication is prevented.

In one embodiment, different frequency resources are configured for a communication link between the base station and any terminal in the coverage of the base station and a backhaul link.

For example, different carrier frequencies are adopted by two links respectively. For example, a carrier frequency adopted by a communication link between the base station and any terminal in the coverage of the base station is 2,300 MHZ, while a carrier frequency adopted by the backhaul link is 2,500 MHZ. In this example, the same time resource may be adopted for communication on the two links. For example, communication is performed on the same sub-frame, so that a communication delay is reduced.

In one embodiment, spaces occupied by beams corresponding to a communication link between the base station and any terminal in the coverage of the base station and a backhaul link do not overlap.

For example, different beams are different in space directivity, and occupy different spaces. The communication link and the backhaul link may correspond to beams which occupy spaces that do not overlap. When the base station transmits data in the form of beams through the two links, the spaces occupied by the beams do not overlap, thereby avoiding mutual interference. In this example, the same time resource and/or frequency resource may be adopted by the communication link and the backhaul link, so that the communication delay may be reduced, the frequency resources may be saved, and communication interference may also be avoided.

The above described allocation manner of different transmission resources to two links is exemplary. If multiple backhaul links are established or the base station is required to provide communication service for multiple terminals in the coverage, the above described transmission resource allocation manner may also be adopted to allocate different transmission resources to the multiple backhaul links and communication links between the base station and the multiple terminals in the coverage so as to avoid communication interference.

In the exemplary embodiment, one or more backhaul links may be timely and reasonably established for the base station according to a communication demand, that is, an aggregated link of the backhaul links is formed. Therefore, communication efficiency may also be improved while solving the problem of bandwidth limits.

Figure 4C:
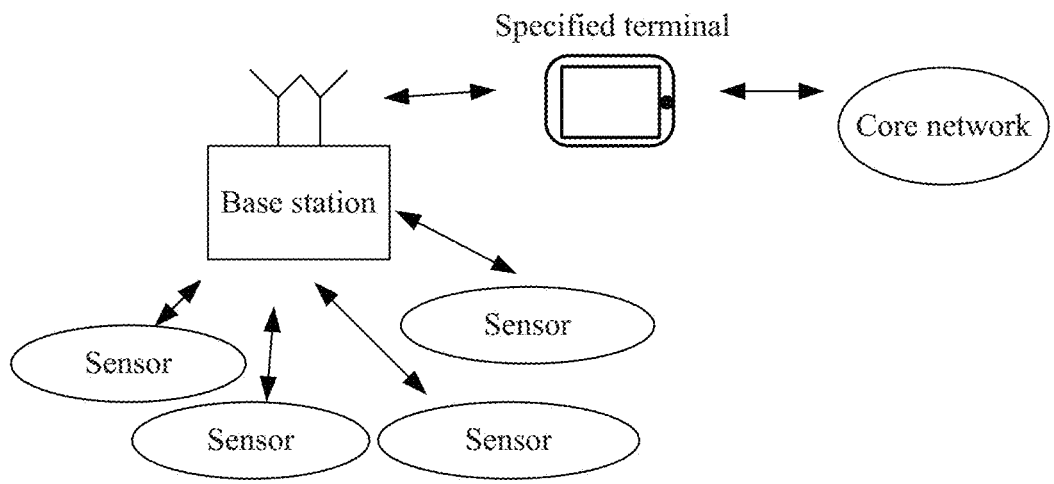
FIG. 4C is a schematic diagram of a communication system, according to an exemplary embodiment.

The methods provided in the present disclosure may be applied to a sensor network. For example, FIG. 4C is a schematic diagram of a communication system 420 according to an exemplary embodiment. Referring to FIG. 4C, a base station, as a control center of a sensor network, may communicate with any sensor in its coverage, and may establish a backhaul link through at least one terminal that has established a communication link with a core network, referred to in FIG. 4C as a specified terminal.

In related technologies, data acquired by a sensor may be periodically uploaded to a server and may not be uploaded in real time, so that the data acquired by the server may be outdated. In contrast, after the backhaul link is established according to the embodiments of the present disclosure, data acquired by the sensor may be uploaded to the core network in real time through the base station and the backhaul link, and may further be uploaded to the server through the core network, so that real-time transmission of the data acquired by the sensor is implemented, and timeliness is guaranteed.

Figure 4D:
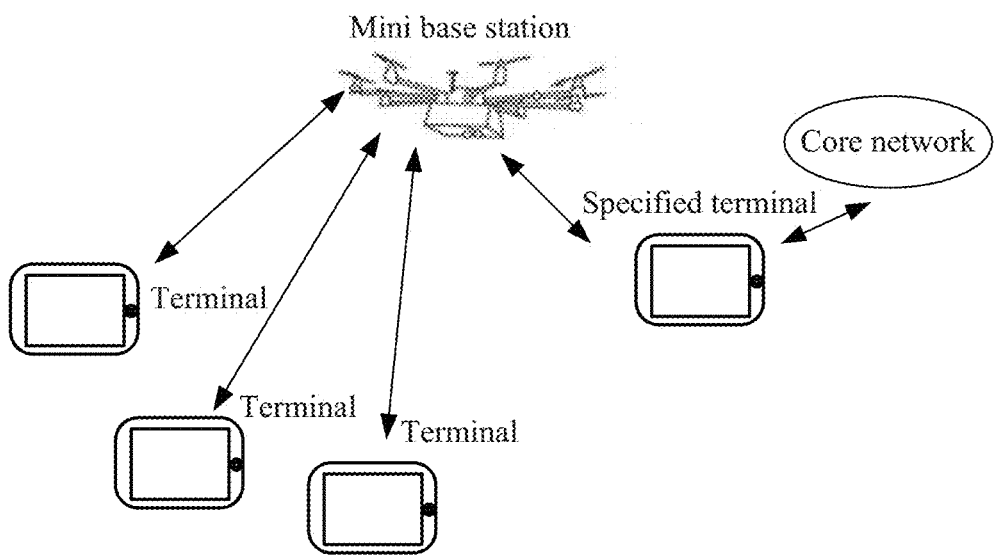
FIG. 4D is a schematic diagram of a communication system, according to an exemplary embodiment.

The methods provided in the present disclosure may be applied to an unmanned aerial vehicle. For example, FIG. 4D is a schematic diagram of a communication system 430 according to an exemplary embodiment. Referring to FIG. 4D, a mini base station is deployed on an unmanned aerial vehicle, and the mini base station may communicate with any terminal in its coverage, and may also establish a backhaul link through at least one terminal that has established a communication link with a core network, referred to in FIG. 4D as a specified terminal.

In related technologies, a conventional backhaul link is usually fixed, so that it is difficult to implement deployment of a mobile mini base station. The embodiment of the present disclosure solves the problem, that is, deployment of a mini base station on the unmanned aerial vehicle may be implemented, so that the coverage may be adjusted by controlling the movement of the unmanned aerial vehicle, so as to provide communication service for a region lacking of infrastructures, or temporarily provide communication service for a region, and higher flexibility is achieved.

Figure 5:
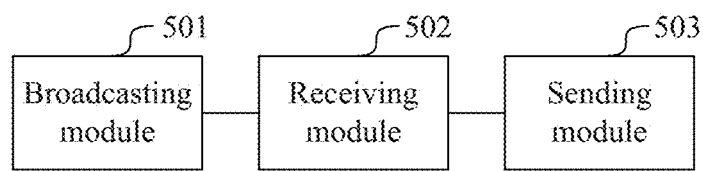
FIG. 5 is a block diagram of a device for establishing a backhaul link, according to an exemplary embodiment.

FIG. 5 is a block diagram of a device 500 for establishing a backhaul link according to an exemplary embodiment. For example, the device 500 may be used in a base station. Referring to FIG. 5, the device 500 includes a broadcasting module 501, a receiving module 502, and a sending module 503.

The broadcasting module 501 is configured to broadcast system information to cause a terminal receiving the system information to return backhaul link establishment signaling, the terminal being a terminal which has established a first communication link with a core network.

The receiving module 502 is configured to receive the backhaul link establishment signaling returned by the terminal, the backhaul link establishment signaling being configured to indicate the terminal to establish a backhaul link for the base station.

The sending module 503 is configured to send a confirmation message to the terminal to cause the terminal to establish a second communication link with the base station after receiving the confirmation message, the second communication link and the first communication link forming a backhaul link.

According to the device 500, the second communication link is established between the terminal which has established the first communication link with the core network and the base station, and the first communication link and the second communication link form a backhaul link. Then the base station may access the core network through the backhaul link. The device 500 provides a flexible and convenient manner for establishing a backhaul link, and a base station may establish multiple backhaul links, achieving extensibility.

In one embodiment, different time resources are configured for a communication link between the base station and any terminal in coverage of the base station and a backhaul link.

In one embodiment, different frequency resources are configured for a communication link between the base station and any terminal in the coverage of the base station and a backhaul link.

In one embodiment, spaces occupied by beams corresponding to a communication link between the base station and any terminal in the coverage of the base station and a backhaul link do not overlap.

Figure 6:
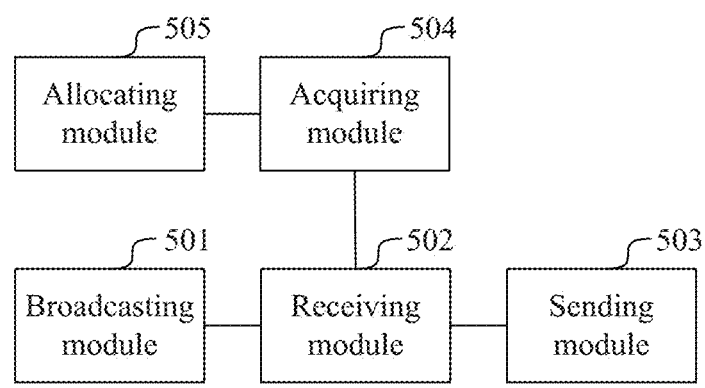
FIG. 6 is a block diagram of a device for establishing a backhaul link, according to an exemplary embodiment.

FIG. 6 is a block diagram of a device 600 for establishing a backhaul link according to an exemplary embodiment. Referring to FIG. 6, the device 600 further includes an acquiring module 504 and an allocating module 505, in addition to the broadcasting module 501, the receiving module 502, and the sending module 503 (FIG. 5).

The receiving module 502 is configured to, under the condition that the base station has established multiple backhaul links, receive at least one data packet sent by a terminal located in the coverage of the base station.

The acquiring module 504 is configured to acquire a QCI of the at least one received data packet, the QCI being configured to indicate a communication priority of the at least one data packet.

The allocating module 505 is configured to allocate the at least one data packet to multiple backhaul links on the basis of current remaining bandwidths of the multiple backhaul links and the QCI of the at least one data packet.

Figure 7:
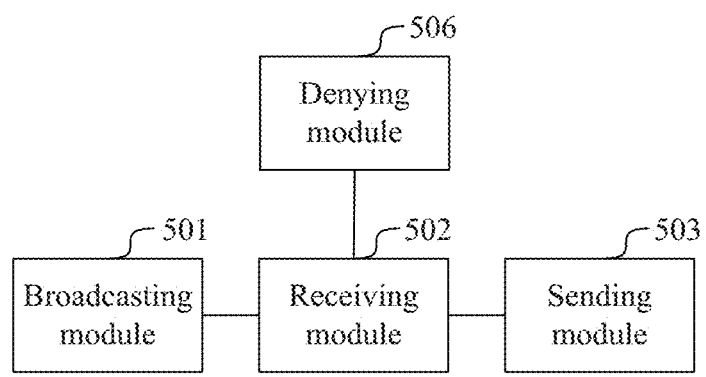
FIG. 7 is a block diagram of a device for establishing a backhaul link, according to an exemplary embodiment.

FIG. 7 is a block diagram of a device 700 for establishing a backhaul link according to an exemplary embodiment. Referring to FIG. 7, the device 700 further includes a denying module 506, in addition to the broadcasting module 501, the receiving module 502, and the sending module 503 (FIG. 5).

The denying module 506 is configured to, under the condition that the base station has not established any backhaul link yet, if an access request of a terminal is received, deny the access request.

Figure 8:
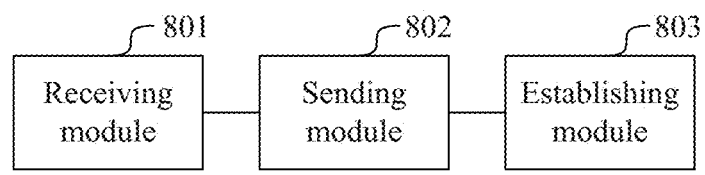
FIG. 8 is a block diagram of a device for establishing a backhaul link, according to an exemplary embodiment.

FIG. 8 is a block diagram of a device 800 for establishing a backhaul link according to an exemplary embodiment. The device 800 may be a terminal which has established a first communication link with a core network. Referring to FIG. 8, the device 800 includes a receiving module 801, a sending module 802, and an establishing module 803.

The receiving module 801 is configured to receive system information broadcasted by a base station.

The sending module 802 is configured to send backhaul link establishment signaling to the base station, the backhaul link establishment signaling being configured to indicate establishment of a backhaul link for the base station.

The establishing module 803 is configured to, when a confirmation message returned by the base station is received, establish a second communication link with the base station, the second communication link and the first communication link forming the backhaul link.

According to the device 800, the second communication link is established between the terminal which has established the first communication link with the core network and the base station, and the first communication link and the second communication link form the backhaul link. Then the base station may access the core network through the backhaul link. The device 800 provides a flexible and convenient manner for establishing a backhaul link, and a base station may establish multiple backhaul links, achieving extensibility.

Figure 9:
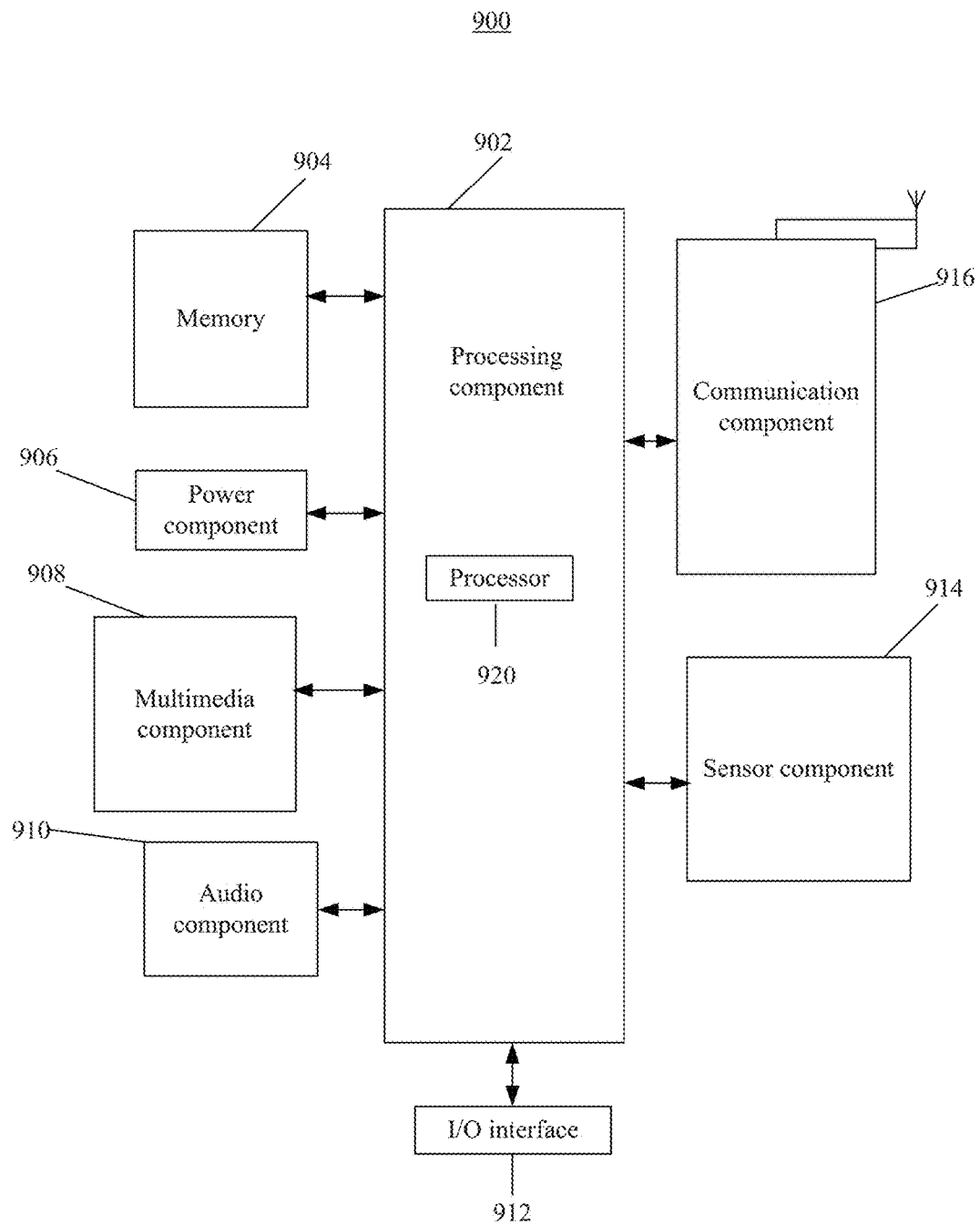
FIG. 9 is a block diagram of a device according to an exemplary embodiment.

FIG. 9 is a block diagram of a device 900 according to an exemplary embodiment. For example, the device 900 may be a terminal such as a mobile phone, a computer, a digital broadcast terminal, a message transceiving device, a game console, a tablet, a medical device, exercise equipment and a personal digital assistant, etc.

Referring to FIG. 9, the device 900 may include one or more of the following components: a processing component 902, a memory 904, a power component 906, a multimedia component 908, an audio component 910, an Input/Output (I/O) interface 912, a sensor component 914, and a communication component 916.

The processing component 902 typically controls overall operations of the device 900, such as the operations associated with display, telephone calls, data communications, camera operation, and recording operation. The processing component 902 may include one or more processors 920 to execute instructions to perform all or part of steps in the abovementioned method. Moreover, the processing component 902 may include one or more modules which facilitate interaction between the processing component 902 and the other components. For instance, the processing component 902 may include a multimedia module to facilitate interaction between the multimedia component 908 and the processing component 902.

The memory 904 is configured to store various types of data to support the operation of the device 900. Examples of such data include instructions for any application programs or methods operated on the device 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 provides power for various components of the device 900. The power component 906 may include a power management system, one or more power supplies, and other components associated with the generation, management and distribution of power for the device 900.

The multimedia component 908 includes a screen providing an output interface between the device 900 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 908 includes a front camera and/or a rear camera. The front camera and/or the rear camera may receive external multimedia data when the device 900 is in an operation mode, such as a photographing mode or a video mode. Each of the front camera and the rear camera may be a fixed optical lens system or have focusing and optical zooming capabilities.

The audio component 910 is configured to output and/or input an audio signal. For example, the audio component 910 includes a microphone configured to receive an external audio signal when the device 900 is in the operation mode, such as a call mode, a recording mode and a voice recognition mode. The received audio signal may be further stored in the memory 904 or sent through the communication component 916. In some embodiments, the audio component 910 further includes a speaker configured to output the audio signal.

The I/O interface 912 provides an interface between the processing component 902 and a peripheral interface module, and the peripheral interface module may be a keyboard, a click wheel, a button and the like. The button may include, but not limited to: a home button, a volume button, a starting button and a locking button.

The sensor component 914 includes one or more sensors configured to provide status assessment in various aspects for the device 900. For instance, the sensor component 914 may detect an on/off status of the device 900 and relative positioning of components, such as a display and small keyboard of the device 900, and the sensor component 914 may further detect a change in a position of the device 900 or a component of the device 900, presence or absence of contact between the user and the device 900, orientation or acceleration/deceleration of the device 900 and a change in temperature of the device 900. The sensor component 914 may include a proximity sensor configured to detect presence of an object nearby without any physical contact. The sensor component 914 may also include a light sensor, such as a Complementary Metal Oxide Semiconductor (CMOS) or Charge Coupled Device (CCD) image sensor, configured for use in an imaging application. In some embodiments, the sensor component 914 may further include an acceleration sensor, a gyroscope sensor, a magnetic sensor, a pressure sensor or a temperature sensor.

The communication component 916 is configured to facilitate wired or wireless communication between the device 900 and another device. The device 900 may access a communication-standard-based wireless network, such as a Wireless Fidelity (Wi-Fi) network, a 2nd-Generation (2G), 3rd-Generation (3G), or 4th-Generation (4G) network or a combination thereof. In an exemplary embodiment, the communication component 916 receives a broadcast signal or broadcast associated information from an external broadcast management system through a broadcast channel In an exemplary embodiment, the communication component 916 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and other technology.

In an exemplary embodiment, the device 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components.

In an exemplary embodiment, there is also provided a non-transitory computer-readable storage medium including instructions, such as included in the memory 904, executable by the processor 920 of the device 900, to perform the above described methods. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

Figure 10:
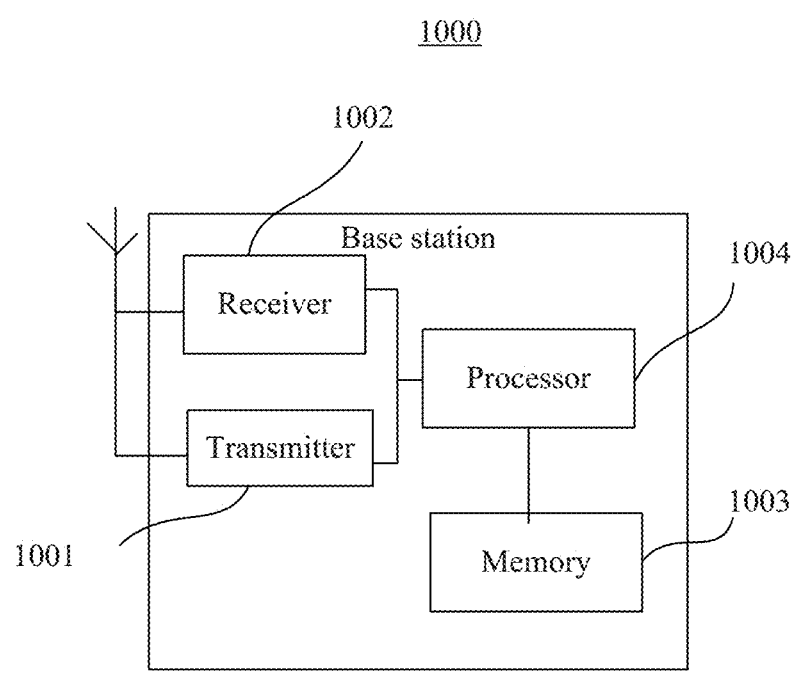
FIG. 10 is a block diagram of a base station according to an exemplary embodiment.

FIG. 10 is a block diagram of a base station 1000 according to an exemplary embodiment. As shown in FIG. 10, the base station 1000 includes a transmitter 1001, a receiver 1002, a memory 1003, and a processor 1004 connected with the transmitter 1001, the receiver 1002 and the memory 1003. The base station 1000 may further include an antenna, a baseband processing component, an intermediate-radio frequency processing component, an I/O device, etc.

The processor 1004 is configured to execute instructions stored in the memory 1003 to perform the above described methods for establishing a backhaul link.

In an exemplary embodiment, there is also provided a non-transitory computer-readable storage medium including instructions, such as included in the memory 1003, executable by the processor 1004 of the base station 1000, to perform the above described methods. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for establishing a backhaul link, applied to a base station, the method comprising:
broadcasting system information to cause at least one first terminal receiving the system information to return backhaul link establishment signaling, wherein the at least one first terminal has established a first communication link with a core network;
receiving the backhaul link establishment signaling returned by the at least one first terminal, the backhaul link establishment signaling being configured to indicate the at least one first terminal to establish a first backhaul link for the base station; and
sending a confirmation message to the at least one first terminal to cause the at least one first terminal to establish a second communication link with the base station after receiving the confirmation message, the second communication link and the first communication link forming the first backhaul link;
wherein when the base station has established multiple backhaul links that comprise the first backhaul link, with respective first terminals that comprise the at least one first terminal, the method further comprises:
receiving at least one data packet sent by at least one second terminal located in a coverage of the base station;
acquiring a quality of service class identifier (QCI) of the at least one data packet, the QCI being configured to indicate a communication priority of the at least one data packet; and
allocating the at least one data packet to the multiple backhaul links on the basis of current remaining bandwidths of the multiple backhaul links and the QCI of the at least one data packet.

2. The method according to claim 1, further comprising:
configuring different time resources for a communication link between the base station and any terminal in the coverage of the base station and the first backhaul link.

3. The method according to claim 1, further comprising:
configuring different frequency resources for a communication link between the base station and any terminal in the coverage of the base station and the first backhaul link.

4. The method according to claim 1, further comprising:
configuring beams corresponding to a communication link between the base station and any terminal in the coverage of the base station and the first backhaul link, such that spaces occupied by the beams do not overlap.

5. The method according to claim 1, wherein when the base station has not established any backhaul link, the method further comprises:
if an access request of the terminal is received, denying the access request.

6. A base station, comprising:
a processor; and
a memory for storing instructions executed by the processor;
wherein the processor is configured to:
broadcast system information to cause at least one first terminal receiving the system information to return backhaul link establishment signaling, wherein the at least one first terminal has established a first communication link with a core network;
receive the backhaul link establishment signaling returned by the at least one first terminal, the backhaul link establishment signaling being configured to indicate the at least one first terminal to establish a first backhaul link for the base station; and
send a confirmation message to the at least one first terminal to cause the at least one first terminal to establish a second communication link with the base station after receiving the confirmation message, the second communication link and the first communication link forming the first backhaul link;
wherein when the base station has established multiple backhaul links that comprise the first backhaul link, with respective first terminals that comprise the at least one first terminal, the processor is further configured to:
receive at least one data packet sent by at least one second terminal located in a coverage of the base station;
acquire a quality of service class identifier (QCI) of the at least one data packet, the QCI being configured to indicate a communication priority of the at least one data packet; and
allocate the at least one data packet to the multiple backhaul links on the basis of current remaining bandwidths of the multiple backhaul links and the QCI of the at least one data packet.

7. The base station according to claim 6, wherein the processor is further configured to:
configure different time resources for a communication link between the base station and any terminal in the coverage of the base station and the first backhaul link.

8. The base station according to claim 6, wherein the processor is further configured to:
configure different frequency resources for a communication link between the base station and any terminal in the coverage of the base station and the first backhaul link.

9. The base station according to claim 6, wherein the processor is further configured to:
configure beams corresponding to a communication link between the base station and any terminal in the coverage of the base station and the first backhaul link, such that spaces occupied by the beams do not overlap.

10. The base station according to claim 6, wherein when the base station has not established any backhaul link, the processor is further configured to:
under a condition that the base station has not established any backhaul link yet, if an access request of any terminal is received, deny the access request.

11. A non-transitory computer-readable storage medium having stored therein instructions that, when executed by a processor of a base station, cause the base station to perform a method for establishing a backhaul link, the method comprising:
broadcasting system information to cause at least one first terminal receiving the system information to return backhaul link establishment signaling, wherein the at least one first terminal has established a first communication link with a core network;
receiving the backhaul link establishment signaling returned by the at least one first terminal, the backhaul link establishment signaling being configured to indicate the at least one first terminal to establish a first backhaul link for the base station; and
sending a confirmation message to the at least one first terminal to cause the at least one first terminal to establish a second communication link with the base station after receiving the confirmation message, the second communication link and the first communication link forming the first backhaul link;

wherein when the base station has established multiple backhaul links that comprise the first backhaul link, with respective first terminals that comprise the at least one first terminal, the method further comprises:

receiving at least one data packet sent by at least one second terminal located in a coverage of the base station;

acquiring a quality of service class identifier (QCI) of the at least one data packet, the QCI being configured to indicate a communication priority of the at least one data packet; and allocating the at least one data packet to the multiple backhaul links on the basis of current remaining bandwidths of the multiple backhaul links and the QCI of the at least one data packet.

* * * * *